US011528046B2

(12) United States Patent
Caporal Del Barrio et al.

(10) Patent No.: US 11,528,046 B2
(45) Date of Patent: Dec. 13, 2022

(54) DYNAMIC UL GAPS FOR MPE DETECTION

(71) Applicant: Nokia Technologies OY, Espoo (FI)

(72) Inventors: Samantha Caporal Del Barrio, Aalborg (DK); Benny Vejlgaard, Gistrup (DK); Simon Svendsen, Aalborg (DK); Petri Juhani Vasenkari, Turku (FI); Sari Kaarina Nielsen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/233,386

(22) Filed: Apr. 16, 2021

(65) Prior Publication Data

US 2022/0337278 A1 Oct. 20, 2022

(51) Int. Cl.
*H04B 1/3827* (2015.01)
*H04W 72/12* (2009.01)
(Continued)

(52) U.S. Cl.
CPC ...... *H04B 1/3838* (2013.01); *H04W 36/0072* (2013.01); *H04W 52/283* (2013.01); *H04W 72/1268* (2013.01)

(58) Field of Classification Search
CPC ..... H04W 52/04; H04W 52/06; H04W 52/08; H04W 52/10; H04W 52/12; H04W 52/125; H04W 52/14; H04W 52/143; H04W 52/146; H04W 52/16; H04W 52/18; H04W 52/20; H04W 52/22; H04W 36/0072;
(Continued)

(56) References Cited

U.S. PATENT DOCUMENTS

| 2011/0003606 A1* | 1/2011 | Forenza | H04B 7/0417 |
| | | | 455/501 |
| 2019/0200365 A1* | 6/2019 | Sampath | H04W 24/10 |
| 2020/0021421 A1* | 1/2020 | Han | H04W 52/367 |

OTHER PUBLICATIONS

Abu-Ali, Najah, et al. "Uplink scheduling in LTE and LTE-advanced: Tutorial, survey and evaluation framework." IEEE Commmunications Surveys & Tutorials 16.3 (2013): 1239-1265. (Year: 2013).*

(Continued)

*Primary Examiner* — Sharad Rampuria
(74) *Attorney, Agent, or Firm* — Harness, Dickey & Pierce, P.L.C.

(57) ABSTRACT

In a system, apparatus, method, and non-transitory computer readable medium for implementing dynamic uplink (UL) gaps for maximum permissible exposure (MPE) detection, a user equipment (UE) device include a wireless antenna array, a memory storing computer readable instructions and a UL gap configuration, and processing circuitry configured to execute the computer readable instructions to cause the device to, determine estimated distance information between a user and the device using the wireless antenna array during at least one first scheduled UL gap of the UL gap scheduling in accordance with the UE maximum transmission power limit, the UL gap scheduling based on a default UL gap periodicity value and a default UL gap duration value, transmit a MPE-related message to the node based on the estimated distance information and a desired MPE threshold, and adjust the UL gap configuration based on the transmitted MPE-related message.

20 Claims, 8 Drawing Sheets

(51) Int. Cl.
*H04W 52/28* (2009.01)
*H04W 36/00* (2009.01)

(58) Field of Classification Search
CPC ........... H04W 52/283; H04W 72/1268; H04W 36/0079; H04W 36/0083; H04W 36/00835; H04W 36/00837; H04W 36/0085; H04W 36/08; H04W 36/18; H04W 36/30; H04W 36/305; H04W 36/32; H04B 1/3838
See application file for complete search history.

(56) References Cited

OTHER PUBLICATIONS

De Figueiredo, Felipe AP, et al. "Channel estimation for massive MIMO TDD systems assuming pilot contamination and frequency selective fading." IEEE access 5 (2017): 17733-17741. (Year: 2017).*

* cited by examiner

FIG. 7B

| UL GAP PERIODICITY | LONG | MPE WARNING | MPE EVENT |
|---|---|---|---|
| | 0.0625% | 0.125% | 0.25% |
| IN SLOTS | EVERY 1600 SLOTS | EVERY 800 SLOTS | EVERY 400 SLOTS |
| IN MS | EVERY 200 MS | EVERY 100 MS | EVERY 50 MS |

FIG. 7C

LONG: | DL | DL | DL | DL | S | UL | DL | DL | DL | DL | S | UL | DL | DL | DL | DL | S | UL GAP |

MPE WARNING: | DL | DL | DL | DL | S | UL | DL | DL | DL | DL | S | UL GAP | DL | DL | DL | DL | S | UL GAP |

MPE EVENT: | DL | DL | DL | DL | S | UL GAP | DL | DL | DL | DL | S | UL GAP | DL | DL | DL | DL | S | UL GAP |

DYNAMIC UL GAPS FOR MPE DETECTION

BACKGROUND

Field

Various example embodiments relate to methods, apparatuses, systems, and/or non-transitory computer readable media for providing dynamic uplink (UL) gaps for at least one user equipment (UE) device to perform maximum permissible exposure (MPE) detection.

Description of the Related Art

A $5^{th}$ generation mobile network (5G) standard, referred to as 5G New Radio (NR), is being developed to provide higher capacity, higher reliability, and lower latency communications than the 4G long term evolution (LTE) standard. The 5G NR standard defines two frequency ranges of operation for UE devices compatible with the 5G NR standard, the Frequency Range (FR) 1 which includes sub-7.125 GHz frequency bands, and FR2 (e.g., mmWave, etc.) which includes frequency bands from 24.25 GHz to 52.6 GHz. Regulatory bodies, such as the Federal Communications Commission (FCC), define a maximum permissible exposure (MPE) for humans which limits the power density transmitted and/or emitted by electronic devices as a function of distance to a human being. For example, current FCC regulations set a MPE level of 10 $W/m^2$ for electronic devices operating between 6 to 10 GHz or operating at the 100 GHz frequency band.

UE devices operating in FR2 or above include high gain antennas to maintain a strong wireless connection with a radio access network (RAN) node, and the high gain antennas may output a large amount of power which could potentially exceed MPE regulations. Accordingly, the UE devices may reduce its output power (e.g., transmission (TX) power levels, etc.) in order to comply with regulations and/or industry recommendations regarding safe MPE levels. However, if the output power of the UE is significantly reduced, e.g., >20 dB for power class 3 (PC3) UEs, it is likely that the UE will lose its connection to the RAN node, e.g., suffer a radio link failure (RLF).

SUMMARY

At least one example embodiment may be related to a user equipment (UE) device.

In at least one example embodiment, the UE device may include a wireless antenna array configured to communicate with a radio access network (RAN) node, a memory storing computer readable instructions and an uplink (UL) gap configuration, the UL gap configuration including UL gap scheduling and a UE maximum transmission power limit for each UL gap, the UL gap scheduling including a UL gap periodicity value and a UL gap duration value, and processing circuitry configured to execute the computer readable instructions to cause the device to, determine estimated distance information between a user and the device using the wireless antenna array during at least one first scheduled UL gap of the UL gap scheduling in accordance with the UE maximum transmission power limit, the UL gap scheduling based on a default UL gap periodicity value and a default UL gap duration value, transmit a maximum permissible exposure (MPE)-related message to the node based on the estimated distance information and a desired MPE threshold, and adjust the UL gap configuration based on the transmitted MPE-related message.

Some example embodiments provide that the device is further caused to receive a dynamic UL gap configuration from the node in response to the MPE-related message, the dynamic UL gap configuration including at least one of a new UE maximum transmission power limit, a new UL gap duration value, a new UL gap periodicity value, or any combinations thereof.

Some example embodiments provide that the received dynamic UL gap configuration includes the new UE maximum transmission power limit, and in response to the received dynamic UL gap configuration including the new UE maximum transmission power limit, the device is further caused to adjust the UL maximum transmission power limit of the wireless antenna array for at least one second scheduled UL gap based on the estimated distance information and the new UE maximum transmission power limit.

Some example embodiments provide that the received dynamic UL gap configuration includes the new UL gap duration value, new UL gap periodicity, or both the new UL gap duration value and the new UL gap periodicity value, and in response to the received dynamic UL gap configuration including the new UL gap duration value, new UL gap periodicity value, or both the new UL gap duration value and the new UL gap periodicity value, the device is further caused to adjust the UL gap scheduling based on the received dynamic UL gap configuration.

Some example embodiments provide that the device is further caused to receive the dynamic UL gap configuration via RRC signaling, MAC signaling, DCI signaling, or any combinations thereof, the dynamic UL gap configuration being UE-specific.

Some example embodiments provide that the desired MPE threshold is at least one of an MPE event report threshold, an MPE warning report threshold, an estimated power back-off report threshold, or any combinations thereof.

Some example embodiments provide that the device is further caused to transmit a UE capabilities message to the node, the UE capabilities message indicating the device supports MPE UL gaps, and receive the dynamic UL gap configuration or a common UL gap configuration from the node in response to the transmitted UE capabilities message.

Some example embodiments provide that the device is further caused to receive a broadcast message from the node, the broadcast message including a new UL gap configuration, and update the UL gap scheduling based on the received new UL gap configuration.

Some example embodiments provide that the device is further caused to update the estimated distance information between the user and the device during at least one second scheduled UL gap, transmit a second maximum permissible exposure (MPE)-related message to the node based on the updated estimated distance information and the desired MPE threshold, and adjust the UL gap configuration based on the second transmitted MPE-related message.

At least one example embodiment may be related to a radio access network (RAN) node.

In at least one example embodiment, the RAN node may include a memory storing computer readable instructions, and processing circuitry configured to execute the computer readable instructions to cause the node to, receive a maximum permissible exposure (MPE)-related message from at least one first user equipment (UE) device, and adjust a UL gap configuration for the at least one first device based on the received MPE-related message.

Some example embodiments provide that the received MPE-related message is at least one of an MPE event report, an MPE warning report, an estimated power back-off report, or any combinations thereof.

Some example embodiments provide that in response to the received MPE-related message, the node is further caused to, determine at least one of a new UE maximum transmission power limit, a new UL gap duration value, a new UL gap periodicity value, or any combinations thereof, based on the MPE-related message, and transmit a dynamic UL gap configuration to the at least one first device, the dynamic UL gap configuration including at least one of the new UE maximum transmission power limit, the new UL gap duration value, the new UL gap periodicity value, or the combinations thereof.

Some example embodiments provide that the determined dynamic UL gap configuration is specific to the at least one first device, and the node is further caused to transmit the dynamic UL gap configuration via RRC signaling, MAC signaling, DCI signaling, or any combinations thereof.

Some example embodiments provide that the node is further caused to, perform a handover operation for the at least one first device based on the received MPE-related message.

Some example embodiments provide that the node is further caused to, receive a UE capabilities message from the at least one first device, the UE capabilities message indicating the UE supports MPE UL gaps, determine a dynamic UL gap configuration for the at least one first device based on the UE capabilities message, the dynamic UL gap configuration including new UL gap scheduling based on a new UL gap duration value, a new UL gap periodicity value, or both the new UL gap duration value and the new UL gap periodicity value, and transmit the dynamic UL gap configuration to the at least one first device in response to the received UE capabilities message.

Some example embodiments provide that the node is further caused to, determine new UL gap configuration for all devices in a cell corresponding to the node, and broadcast the new UL gap configuration to the cell.

Some example embodiments provide that the node is further caused to, schedule at least one UL slot for at least one second device during at least one scheduled UL gap for the at least one first device.

At least one example embodiment may be related to a method of operating a UE device.

In at least one example embodiment, the method may include determining estimated distance information between a user and the device using a wireless antenna array during at least one first scheduled UL gap of UL gap scheduling associated with a UL gap configuration for the device, the determining the estimated distance information performed in accordance with a UE maximum transmission power limit associated with the UL gap configuration, and the UL gap scheduling based on a default UL gap periodicity setting and a default UL gap duration, transmitting a maximum permissible exposure (MPE)-related message to a radio access network (RAN) node based on the estimated distance information and a desired MPE threshold, and adjusting the UL gap configuration based on the transmitted MPE-related message.

Some example embodiments provide that the method may further include receiving a dynamic UL gap configuration from the node in response to the MPE-related message, the dynamic UL gap configuration including at least one of a new UE maximum transmission power limit, a new UL gap duration setting, a new UL gap periodicity, or any combinations thereof.

Some example embodiments provide that the method may further include updating the estimated distance information between the user and the device during at least one second scheduled UL gap, transmitting a second maximum permissible exposure (MPE)-related message to the node based on the updated estimated distance information and the desired MPE threshold, and adjusting the UL gap configuration based on the second transmitted MPE-related message.

At least one example embodiment may be related to a user equipment (UE) device.

In at least one example embodiment, the UE device may include means for communicating with a radio access network (RAN) node, storing computer readable instructions and an uplink (UL) gap configuration, the UL gap configuration including UL gap scheduling and a UE maximum transmission power limit for each UL gap, the UL gap scheduling including a UL gap periodicity value and a UL gap duration value, determining estimated distance information between a user and the device using the wireless antenna array during at least one first scheduled UL gap of the UL gap scheduling in accordance with the UE maximum transmission power limit, the UL gap scheduling based on a default UL gap periodicity value and a default UL gap duration value, transmitting a maximum permissible exposure (MPE)-related message to the node based on the estimated distance information and a desired MPE threshold, and adjusting the UL gap configuration based on the transmitted MPE-related message.

Some example embodiments provide that the device further includes means for receiving a dynamic UL gap configuration from the node in response to the MPE-related message, the dynamic UL gap configuration including at least one of a new UE maximum transmission power limit, a new UL gap duration value, a new UL gap periodicity value, or any combinations thereof.

Some example embodiments provide that the received dynamic UL gap configuration includes the new UE maximum transmission power limit, and in response to the received dynamic UL gap configuration including the new UE maximum transmission power limit, the device further includes means for adjusting the UL maximum transmission power limit of the wireless antenna array for at least one second scheduled UL gap based on the estimated distance information and the new UE maximum transmission power limit.

Some example embodiments provide that the received dynamic UL gap configuration includes the new UL gap duration value, new UL gap periodicity, or both the new UL gap duration value and the new UL gap periodicity value, and in response to the received dynamic UL gap configuration including the new UL gap duration value, new UL gap periodicity value, or both the new UL gap duration value and the new UL gap periodicity value, the device further includes means for adjusting the UL gap scheduling based on the received dynamic UL gap configuration.

Some example embodiments provide that the device further includes means for receiving the dynamic UL gap configuration via RRC signaling, MAC signaling, DCI signaling, or any combinations thereof, the dynamic UL gap configuration being UE-specific.

Some example embodiments provide that the desired MPE threshold is at least one of an MPE event report threshold, an MPE warning report threshold, an estimated power back-off report threshold, or any combinations thereof.

Some example embodiments provide that the device further includes means for transmitting a UE capabilities message to the node, the UE capabilities message indicating the device supports MPE UL gaps, and receiving the dynamic UL gap configuration or a common UL gap configuration from the node in response to the transmitted UE capabilities message.

Some example embodiments provide that the device further includes means for receiving a broadcast message from the node, the broadcast message including a new UL gap configuration, and updating the UL gap scheduling based on the received new UL gap configuration.

Some example embodiments provide that the device further includes means for updating the estimated distance information between the user and the device during at least one second scheduled UL gap, transmitting a second maximum permissible exposure (MPE)-related message to the node based on the updated estimated distance information and the desired MPE threshold, and adjusting the UL gap configuration based on the second transmitted MPE-related message.

At least one example embodiment may be related to a radio access network (RAN) node.

In at least one example embodiment, the RAN node may include means for storing computer readable instructions, receiving a maximum permissible exposure (MPE)-related message from at least one first user equipment (UE) device, and adjusting a UL gap configuration for the at least one first device based on the received MPE-related message.

Some example embodiments provide that the received MPE-related message is at least one of an MPE event report, an MPE warning report, an estimated power back-off report, or any combinations thereof.

Some example embodiments provide that in response to the received MPE-related message, the node further includes means for determining at least one of a new UE maximum transmission power limit, a new UL gap duration value, a new UL gap periodicity value, or any combinations thereof, based on the MPE-related message, and transmitting a dynamic UL gap configuration to the at least one first device, the dynamic UL gap configuration including at least one of the new UE maximum transmission power limit, the new UL gap duration value, the new UL gap periodicity value, or the combinations thereof.

Some example embodiments provide that the determined dynamic UL gap configuration is specific to the at least one first device, and the node further includes means for transmitting the dynamic UL gap configuration via RRC signaling, MAC signaling, DCI signaling, or any combinations thereof.

Some example embodiments provide that the node further includes means for, performing a handover operation for the at least one first device based on the received MPE-related message.

Some example embodiments provide that the node further includes means for, receiving a UE capabilities message from the at least one first device, the UE capabilities message indicating the UE supports MPE UL gaps, determining a dynamic UL gap configuration for the at least one first device based on the UE capabilities message, the dynamic UL gap configuration including new UL gap scheduling based on a new UL gap duration value, a new UL gap periodicity value, or both the new UL gap duration value and the new UL gap periodicity value, and transmitting the dynamic UL gap configuration to the at least one first device in response to the received UE capabilities message.

Some example embodiments provide that the node further includes means for, determining new UL gap configuration for all devices in a cell corresponding to the node, and broadcasting the new UL gap configuration to the cell.

Some example embodiments provide that the node further includes means for, scheduling at least one UL slot for at least one second device during at least one scheduled UL gap for the at least one first device.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIG. 7B is an table illustrating example UL gap periodicity values according to at least one example embodiment; and FIG. 7C is an example of UL/DL scheduling according to some example embodiments.

DETAILED DESCRIPTION

Figure 1:
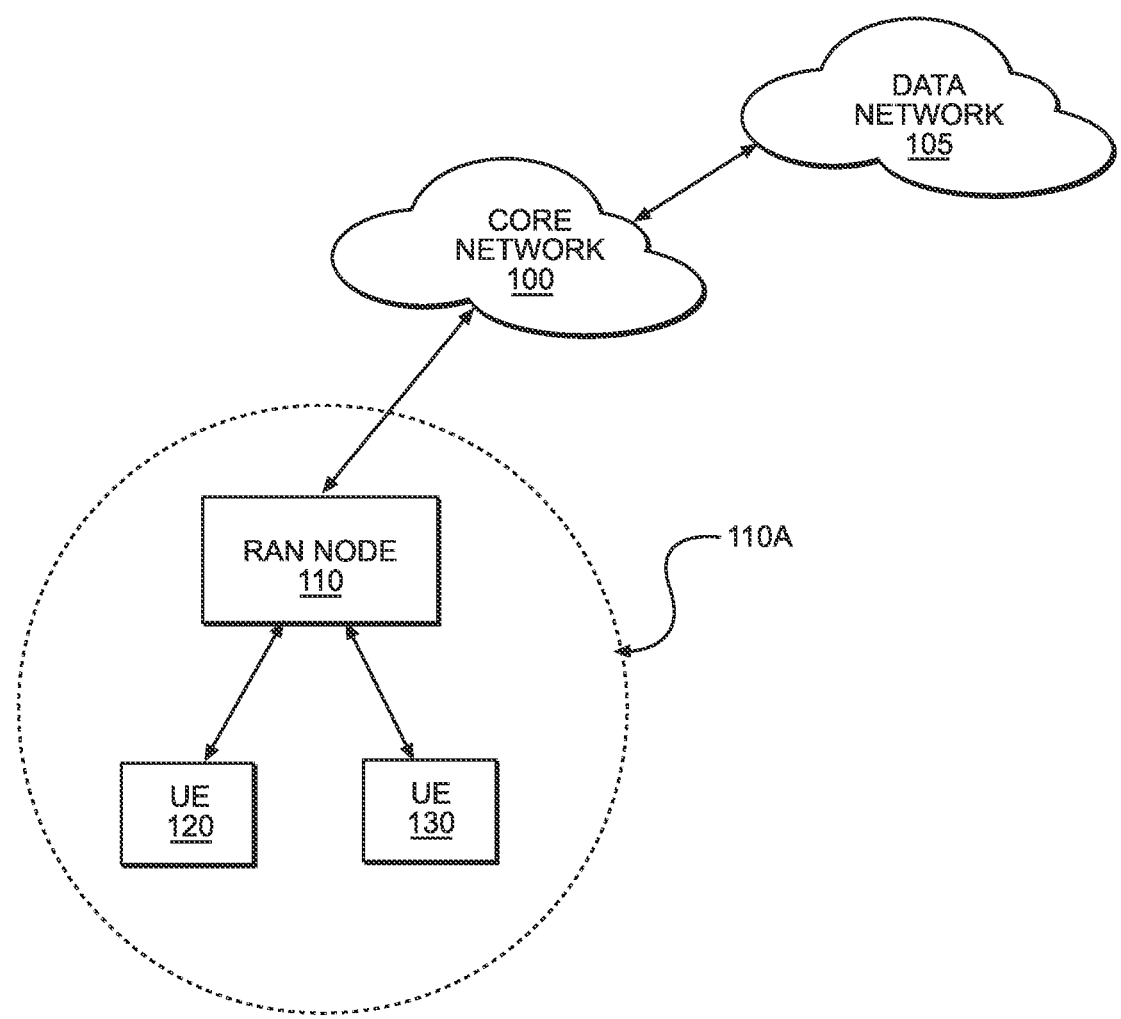
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc. Moreover, while the example embodiments are discussed with reference to the FR2 frequency range of the 5G standard and/or the 60 GHz frequency range (e.g., extension to the FR2 frequency range, etc.), for the sake of clarity and convenience the example embodiments are not limited thereto and the example embodiments may also be applicable to other frequency ranges, such as FR1, sub-THz or THz range frequencies, etc.

Various example embodiments are directed towards enhancements to uplink (UL) gaps used by UE devices to detect the presence of a user nearby, and more specifically, enabling the implementation of dynamic UL gap scheduling by the network and/or dynamic maximum power reduction (P-MPR) of a UE's transmission power based on the detection of a person by the UE device. Current UE devices capable of transmitting at higher equivalent isotropic radiated power (EIRP) levels than specified by FCC MPE regulations, must include proximity sensors, such as infrared (IR) sensors, capacitive sensors or other proximity sensor types, to detect the presence of a person within a desired and/or predetermined distance from the UE device, but cannot accurately detect the distance between the person and the UE device. Further, if a person is detected within that predetermined distance, the UE device reduces its maximum output power (e.g., P-MPR, maximum transmission power, maximum UL power, etc.) to a maximum EIRP value associated with the person being in contact with the UE device. However, in the event that the user is between the predetermined distance away from the UE device, but not in contact with the UE device, the UE's maximum output power may be reduced too greatly and/or more than necessary, and the UE may suffer unnecessary RLF events, and may unnecessarily decrease its UL throughput.

Further, under the current 5G NR standard, UL gaps may be scheduled on a desired and/or predetermined periodic basis for UE devices so that UE devices may perform self-calibration (e.g., power amplifier (PA) calibration, etc.).

Accordingly, there is a desire to improve UE devices by using dynamic P-MPR and/or dynamic UL power back, instead of statically reducing the P-MPR to a minimum allowed P-MPR, based on a detected distance of the UE device to a person, such as a user of the UE device. Further, there is a desire to use the wireless antenna panel of the UE device to detect the presence of a person within the proximity of the UE device and/or estimate the distance of the person to the UE device during a scheduled UL gap in order to determine the amount to reduce the P-MPR. Additionally, there is a desire to allow a UE and/or a RAN node to dynamically configure UL gaps so that the periodicity of the scheduled UL gaps is increased (e.g., become more frequent, etc.) if a person is detected within a desired warning range of the UE device, so that the UE device may more accurately and more frequently determine the person's distance away from the UE device and appropriately decrease the maximum transmission power limit of the UE device. Also, there is a desire to modify the scheduled duration of the UL gaps based on the distance of the UE device to the user to increase the throughput of the UE device. Further, there is a desire to provide UE specific UL gaps and/or UL gap configuration settings so that a RAN node may schedule UE devices which do not need to perform power back off due to the presence of a person (e.g., UE devices where no people are currently nearby, etc.) to perform UL during a UL gap scheduled for other UE devices which have triggered a MPE event, etc.

FIG. 1 illustrates a wireless communication system according to at least one example embodiment. As shown in FIG. 1, a wireless communication system includes a core network 100, and a Data Network 105, a first radio access network (RAN) node 110, a first user equipment (UE) device 120, and/or a second UE device 130, but the example embodiments are not limited thereto and the example embodiments may include a greater or lesser number of constituent elements. For example, the wireless communication system may include a single UE device, three or more UE devices, two or more RAN nodes, additional base stations, routers, access points, gateways, etc.

The RAN node 110 and/or the UE devices 120 and 130 may be connected over a wireless network, such as a cellular wireless access network (e.g., a 3G wireless access network, a 4G-Long Term Evolution (LTE) network, a 5G-New Radio (e.g., 5G) wireless network, a WiFi network, etc.). The wireless network may include a core network 100 and/or a Data Network 105. The RAN node 110 may connect to each other and/or other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

According to some example embodiments, the RAN node 110 may act as a relay node (e.g., an integrated access and backhaul (IAB) node) and may communicate with the UE devices 120 and/or 130 in combination with at least one base station (and/or access point (AP), router, etc.) (not shown) of the same or a different radio access technology (e.g., WiFi, etc.).

The UE devices 120 and/or 130 may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s). The UE devices 120 and 130 may be configurable to transmit and/or receive data in accordance to strict latency, reliability, and/or accuracy requirements, such as URLLC communications, TSC communications, etc., but the example embodiments are not limited thereto.

The wireless communication system further includes at least one RAN node (e.g., a base station, a wireless access point, etc.), such as RAN node 110, etc. The RAN node 110 may operate according to an underlying cellular and/or wireless radio access technology (RAT), such as 5G NR, LTE, Wi-Fi, etc. For example, the RAN node 110 may be a 5G gNB node, a LTE eNB node, or a LTE ng-eNB node, etc., but the example embodiments are not limited thereto. The RAN node 110 may provide wireless network services to one or more UE devices within a cell service area (e.g., a broadcast area, a serving area, a coverage area, etc.) surrounding the respective physical location of the RAN node, such as a cell service area 110A surrounding the RAN node 110, etc. For example, UE devices 120 and 130 are located within the cell service area 110A, and may connect to, receive broadcast messages from, receive paging messages from, receive/transmit signaling messages from/to, and/or access the wireless network through, etc., RAN node 110 (e.g., the RAN node serving the UE devices 120 and 130, etc.), but the example embodiments are not limited thereto.

Additionally, the RAN node 110 may be configured to operate in a multi-user (MU) multiple input multiple out (MIMO) mode and/or a massive MIMO (mMIMO) mode, wherein the RAN node 110 transmits a plurality of beams (e.g., radio channels, datastreams, streams, etc.) in different spatial domains and/or frequency domains using a plurality of antennas (e.g., antenna panels, antenna elements, an antenna array, etc.) and beamforming and/or beamsteering techniques.

The RAN node 110 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., and/or equivalent functions, but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system, such as access points, switches, routers, nodes, servers, gateways, etc.

Figure 2:
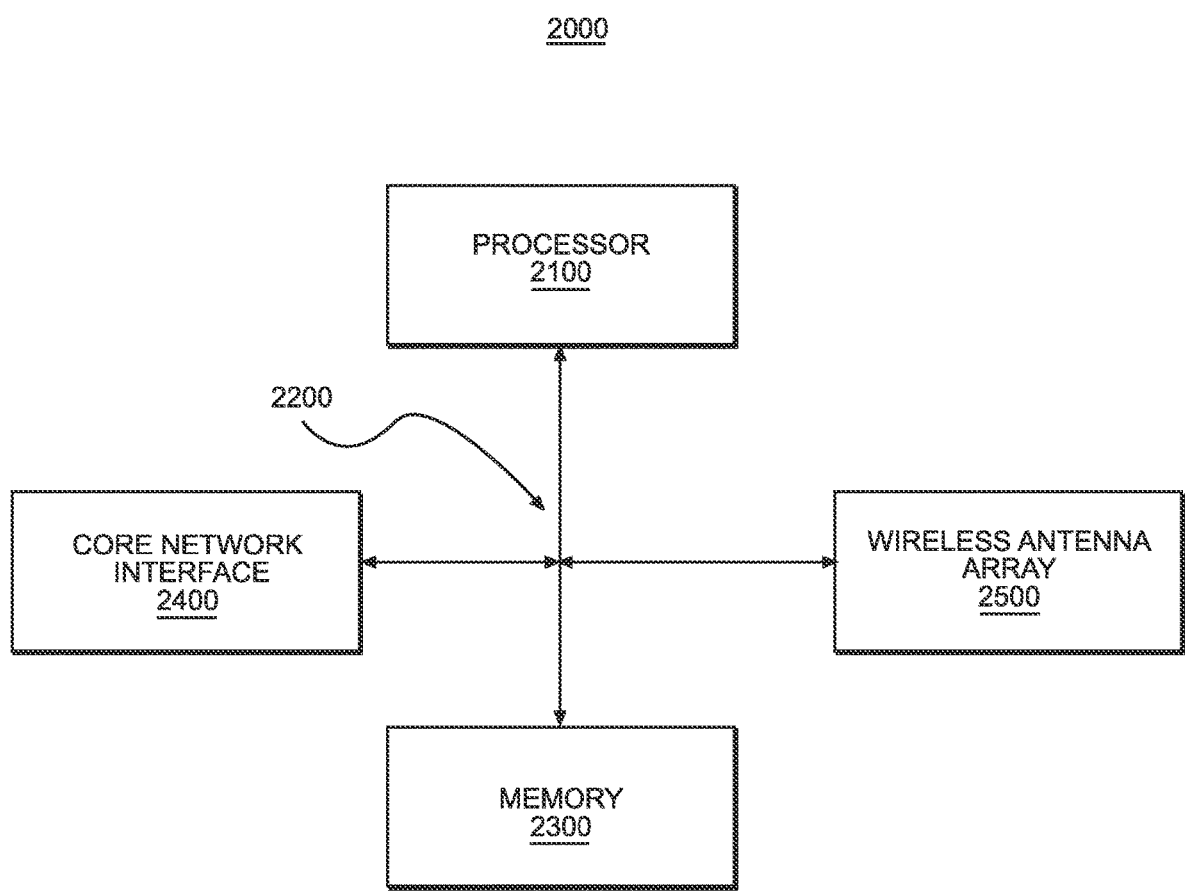
FIG. 2 illustrates a block diagram of an example RAN node according to at least one example embodiment.

FIG. 2 illustrates a block diagram of an example RAN node according to at least one example embodiment. The RAN node of FIG. 2 may correspond to the RAN node 110 of FIG. 1, but is not limited thereto.

Referring to FIG. 2, a RAN node 2000 may include processing circuitry, such as at least one processor 2100, at least one communication bus 2200, a memory 2300, at least one core network interface 2400, and/or at least one wireless antenna array 2500, etc., but the example embodiments are not limited thereto. For example, the core network interface 2400 and the wireless antenna array 2500 may be combined into a single network interface, etc., or the RAN node 2000 may include a plurality of wireless antenna arrays, a plurality of core network interfaces, etc., and/or any combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIGS. 4 to 6, the at least one core network interface 2400, and/or at least one wireless antenna array 2500, etc. Such software elements may be loaded from a non-transitory computer-readable storage medium independent of the memory 2300, using a drive mechanism (not shown) connected to the RAN node 2000, or via the at least one core network interface 2400, and/or at least one wireless antenna array 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule time domain resource allocations (TDRAs), e.g., orthogonal frequency division multiplexing (OFDM) symbols, physical resource blocks (PRBs), resource elements, etc., for UE devices connected to the RAN node 2000, but the example embodiments are not limited thereto.

For example, the RAN node 2000 may allocate time-frequency resources of a carrier (e.g., resource blocks with time and frequency dimensions) based on operation on the time domain (e.g., time division duplexing) and the frequency domain (e.g., frequency division duplexing). In the time domain context, the RAN node 2000 will allocate a carrier (or subbands of the carrier) to one or more UEs (e.g., UE 120, UE 130, etc.) connected to the RAN node 2000 during designated upload (e.g., uplink (UL)) time periods and designated download (e.g., downlink (DL)) time periods, or during designated special (S) time periods which may be used for UL and/or DL. Additionally, according to some example embodiments, the RAN node 2000 may schedule UL gap time periods for one or more UEs of the RAN node 2000's cell coverage area (e.g., cell coverage area 110A), and the UEs may perform self-calibration (e.g., power amplifier (PA) calibration, internal calibration, etc.) during the scheduled UL gap time period (e.g., UL gap slot, etc.), but the example embodiments are not limited thereto. Further, according to some example embodiments, the UEs may perform user detection, proximity detection, etc., during the scheduled UL gaps, etc.

When there are multiple UEs connected to the RAN node 2000, the carrier is shared in time such that each UE is scheduled by the RAN node 2000, and the RAN node 2000 allocates each UE with their own uplink time and/or downlink time. In the frequency domain context and/or when performing spatial domain multiplexing of UEs (e.g., MU MIMO, etc.), the RAN node 2000 will allocate separate frequency subbands of the carrier to UEs simultaneously served by the RAN node 2000, for uplink and/or downlink transmissions. Data transmission between the UE and the RAN node 2000 may occur on a radio frame basis in both the time domain and frequency domain contexts. The minimum resource unit for allocation and/or assignment by the RAN node 2000 to a particular UE device corresponds to a specific downlink/uplink time interval (e.g., one OFDM symbol, one slot, one minislot, one subframe, etc.) and/or a specific downlink/uplink resource block (e.g., twelve adjacent subcarriers, a frequency subband, etc.).

For the sake of clarity and consistency, the example embodiments will be described as using the time domain, but the example embodiments are not limited thereto.

Additionally, the RAN node 2000 may transmit scheduling information via physical downlink common channel (PDCCH) information to the one or more UE devices located within the cell servicing area of the RAN node 2000, which may configure the one or more UE devices to transmit (e.g., UL transmissions via physical uplink control channel (PUCCH) information and/or physical uplink shared channel information (PUSCH), etc.) and/or receive (e.g., DL transmissions via PDCCH and/or physical downlink shared channel information (PDSCH), etc.) data packets to and/or from the RAN node 2000. Additionally, the RAN node 2000 may transmit control messages to the UE device using downlink control information (DCI) messages via physical (PHY) layer signaling, medium access control (MAC) layer control element (CE) signaling, radio resource control (RRC) signaling, etc., but the example embodiments are not limited thereto.

The RAN node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, such as UE 120, UE 130, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The RAN node 2000 may communicate with a core network (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as a core network gateway (not shown), a Data Network (e.g., Data Network 105), such as the Internet, intranets, wide area networks, telephone networks, VoIP networks, etc.

While FIG. 2 depicts an example embodiment of a RAN node 2000, the RAN node is not limited thereto, and may include additional and/or alternative architectures that may be suitable for the purposes demonstrated. For example, the functionality of the RAN node 2000 may be divided among a plurality of physical, logical, and/or virtual network elements, such as a centralized unit (CU), a distributed unit (DU), a remote radio head (RRH), and/or a remote radio unit (RRU), etc., but the example embodiments are not limited thereto. Additionally, the RAN node 2000 may operate in standalone (SA) mode and/or non-standalone (NSA) mode using interfaces (not shown) such as X2, Xn, etc., between the RAN node 2000 and other RAN nodes of the wireless network, interfaces, such as S1, NG, etc., between the RAN node 2000 and the core network (e.g., core network 100), interfaces between network functions of the RAN node 2000 operating in a distributed and/or virtual RAN mode (not shown), such as F1, E1, etc., and/or interfaces between the physical layer (e.g., a baseband unit, etc.) and the radio layer (e.g., a RRH, core network interface 2400, etc.) (not shown), such as CPRI, eCPRI, etc., but the example embodiments are not limited thereto.

Figure 3:
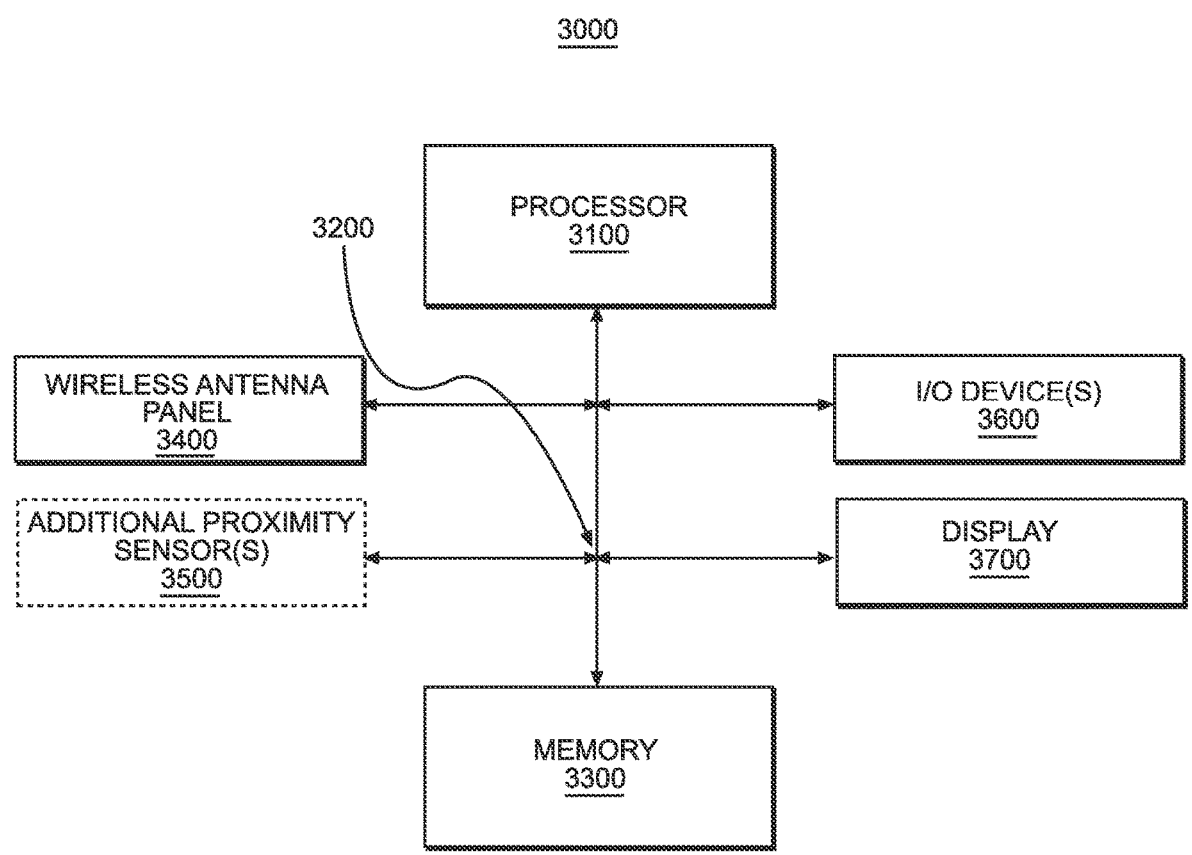
FIG. 3 illustrates a block diagram of an example UE device according to at least one example embodiment.

FIG. 3 illustrates a block diagram of an example UE device according to at least one example embodiment. The example UE device 3000 of FIG. 3 may correspond to the UE device(s) 120 and/or 130 of FIG. 1, but the example embodiments are not limited thereto.

Referring to FIG. 3, a UE 3000 may include processing circuitry, such as at least one processor 3100, at least one communication bus 3200, a memory 3300, a plurality of wireless antennas and/or wireless antenna panels 3400, at least one input/output (I/O) device 3600 (e.g., a keyboard, a touchscreen, a mouse, a microphone, a camera, a speaker, etc.), and/or a display panel 3700 (e.g., a monitor, a touch-screen, etc.), but the example embodiments are not limited thereto. According to some example embodiments, the UE 3000 may include a greater or lesser number of constituent components, and for example, the UE 3000 may also include at least one proximity sensors 3500 (e.g., an infra-red proximity sensor, a capacitive proximity sensor, etc.), a battery, one or more location sensors (e.g., GPS, GLONASS, Beidou, Galileo, etc.), other sensors (e.g., thermometers, humidity sensors, pressure sensors, motion sensors, accelerometers, etc.), actuators, a single wireless antenna and/or a single wireless antenna panel, etc. Additionally, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 4 to 6, the wireless antenna 3400, and/or the additional proximity sensors 3500, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, resource block scheduling, a TDRA table, UL gap configuration settings, etc., for communicating with at least on RAN node, e.g., RAN node 110, etc., accessing a wireless network, etc., but the example embodiments are not limited thereto.

In at least one example embodiment, the at least one communication bus 3200 may enable communication and data transmission/reception to be performed between elements of the UE 3000. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include at least one wireless antenna panel 3400, but is not limited thereto. The at least one wireless antenna panel 3400 may include at least one associated radio unit (not shown) and may be used to transmit wireless signals in accordance with at least one desired radio access technology, such as 4G LTE, 5G NR, Wi-Fi, etc. The at least one wireless antenna panel 3400 may be located at the same or different physical locations on the body of the UE 3000, may have the same or different orientations, may operate in the same or different frequency ranges, may operate in accordance with the same or different radio access technology, etc. According to some example embodiments, the at least one wireless antenna panel 3400 may be a single antenna, or may be a plurality of antennas, etc.

According to some example embodiments, the UE 3000 may use the at least one wireless antenna panel 3400 as a radar proximity sensor. More specifically, the UE 3000 may configure at least one antenna of the wireless antenna panel 3400 to transmit a wireless pulse, and in the event that there is a person and/or a body part of a person (e.g., the user's hand, etc.) near the UE 3000, the wireless pulse will be reflected. Additionally, the UE 3000 may configure at least one other antenna of the wireless antenna panel 3400 to receive the reflected wireless pulse. According to some example embodiments, a distance (or estimated distance) between the UE 3000 (and/or the wireless antenna panel 3400) and the user may be calculated based on the amount of time between the transmission of the wireless pulse by the wireless antenna panel 3400 and the detection of the reflected wireless pulse by the wireless antenna panel 3400.

As an example, assuming the wireless antenna panel 3400 operates on a carrier bandwidth of 400 MHz, the corresponding sampling period is 2.5 ns based on the following equations:

[Equations 1 and 2]

Nyquist sampling rate =

$$2 * \text{Baseband}_{BW} = 400 \text{ MHz} \left( = 400 \frac{Msamples}{s} \right)$$

$$\text{Sampling period (time accuracy)} = \frac{1}{\text{Nyquist sampling rate}} = 2.5 \text{ ns}$$

Moreover, the minimum detectable distance may be calculated using the following equation:

$$\text{detection} = \frac{\text{distance}_{Round\ trip}}{2} = \frac{\text{speed of light}}{4 * \text{Baseband}_{BW}} \qquad [\text{Equation 3}]$$

Thus, if the UE 3000 is operating on a 800 MHz carrier bandwidth, the minimum detectable distance is 19.4 cm away from the wireless antenna panel 3400. Similarly, if a 1600 MHz carrier bandwidth is used, the minimum detection distance will be 4.7 cm.

According to some example embodiments, the UE 3000 may also include additional proximity sensors 3500. The additional proximity sensors 3500 may include a separate an infra-red sensor, a capacitive sensor, a standalone radar sensor, etc., or any combinations thereof, but the example embodiments are not limited thereto. The UE 3000 may use one or more of the additional proximity sensors 3500 as an alternative to using the wireless antenna panel 3400 to determine the presence of a person, e.g., the user of the UE 3000, etc., and/or the distance to the detected person, etc., but the example embodiments are not limited thereto. However, according to at least one example embodiment, the additional proximity sensors 3500 may be omitted from the UE 3000 in order to reduce the complexity of the UE 3000, avoid the additional space required in the form factor of the UE 3000 due to the inclusion of the additional proximity sensors 3500, reduce the battery usage of the UE 3000, and/or avoid the added monetary cost of inclusion of the additional proximity sensors 3500, but the example embodiments are not limited thereto.

The UE 3000 may also include at least one location sensor (not shown) to calculate the absolute and/or relative location of the UE 3000. The at least one location sensor may be a GNSS sensor, such as a GPS sensor, a GLONASS sensor, a Galileo sensor, a Beidou sensor, etc., an inertial movement sensors, such as a gyroscope, an accelerometer, an altimeter, etc. Additionally, the location sensor and/or the processor 3100 may also use cellular network based positioning services, such as a cellular network location service (e.g., a location management function (LMF) service of the core network), an Assisted-GPS (A-GPS) function, etc., to determine the current location of the UE 3000. In some example embodiments, the cellular network location service may also include a network based positioning solution, such as downlink time difference of arrival (DL-TDOA), an uplink time difference of arrival (UL-TDOA), an enhanced cell ID (E-CID), an uplink angle of arrival (UL-AoA), a downlink angle of departure (DL-AoD), a multi-cell round trip time (multi-RTT), etc., or any combination thereof. In some additional example embodiments, the cellular network location solution may also be run at the UE side (i.e., in UE based mode). However, the example embodiments are not limited thereto, and other location determining techniques may be used as well.

While FIG. 3 depicts an example embodiment of a UE 3000, the UE device is not limited thereto, and may include additional and/or alternative architectures that may be suitable for the purposes demonstrated.

Figure 4:
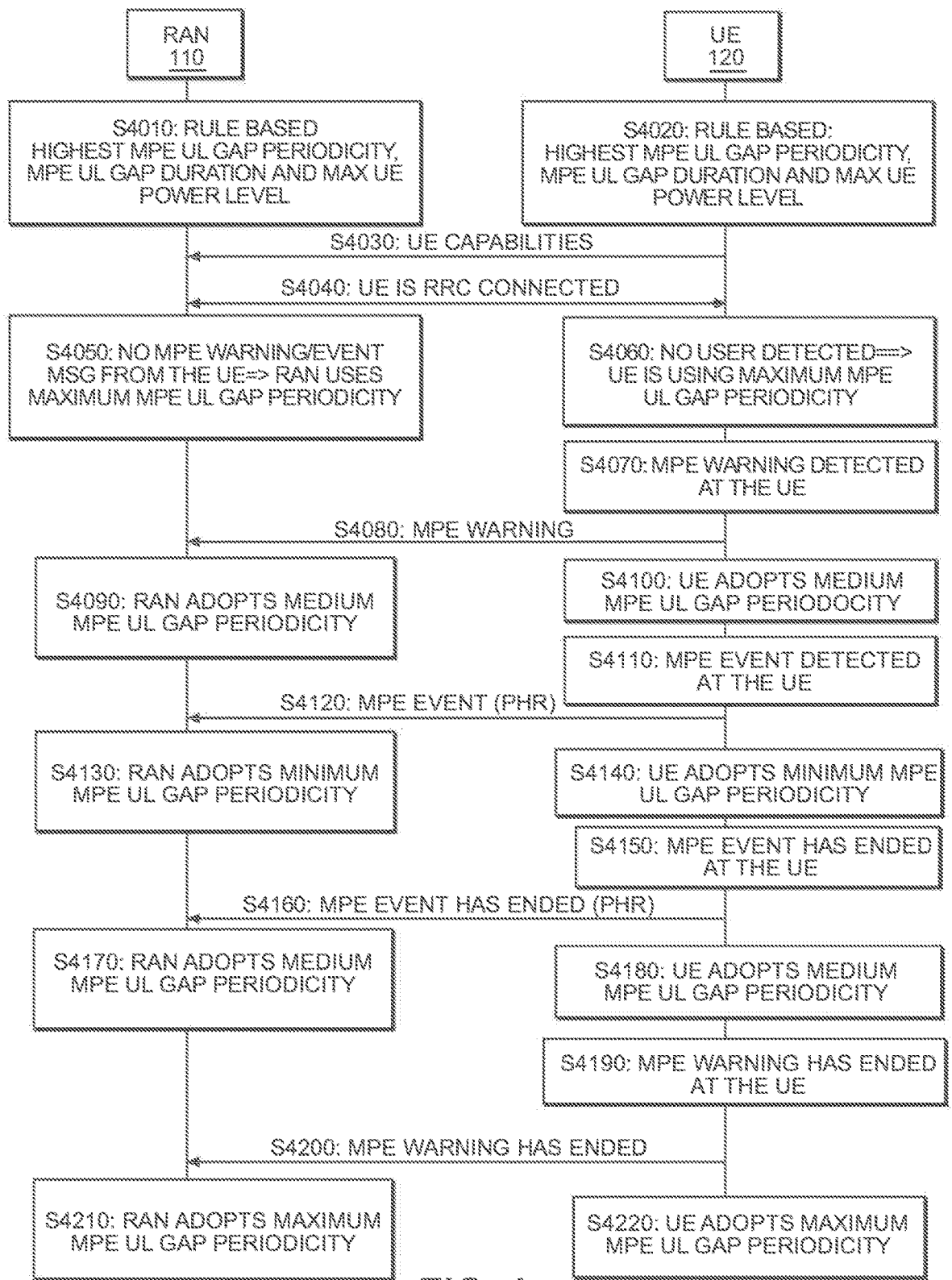
FIGS. 4 to 6 illustrate examples transmission flow diagrams according to some example embodiments.
Figure 5:
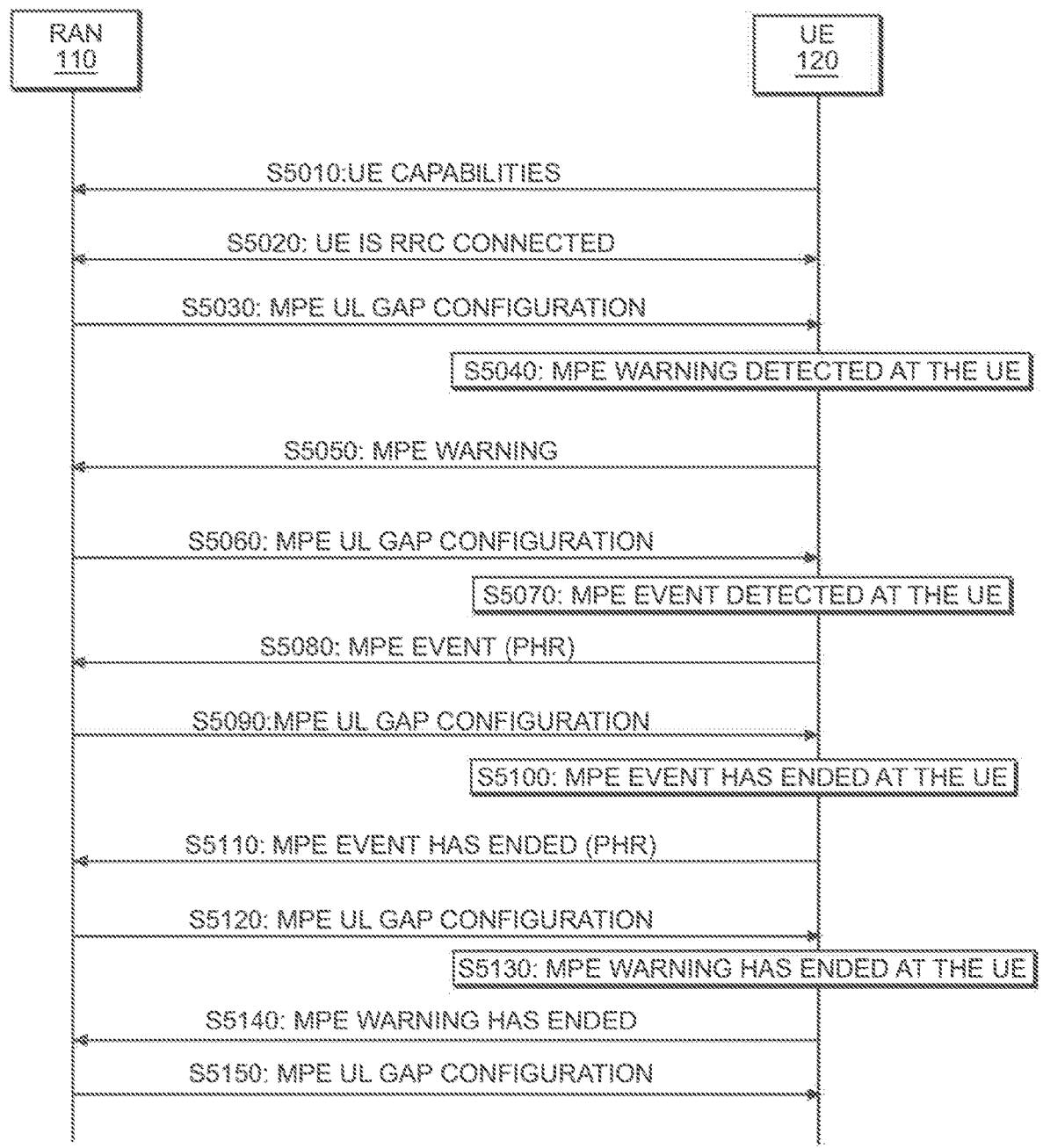
Figure 6:
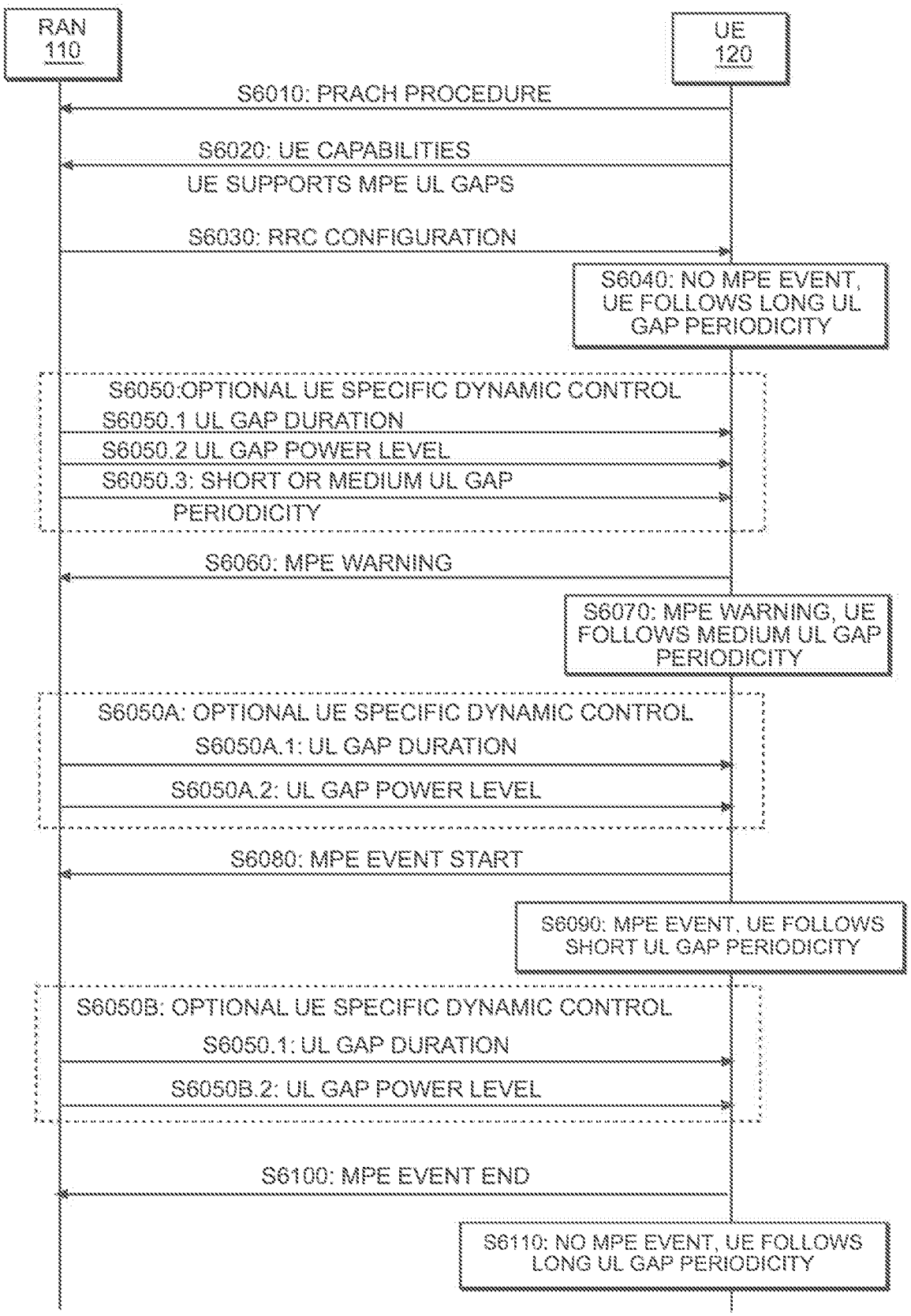
Figure 7A:
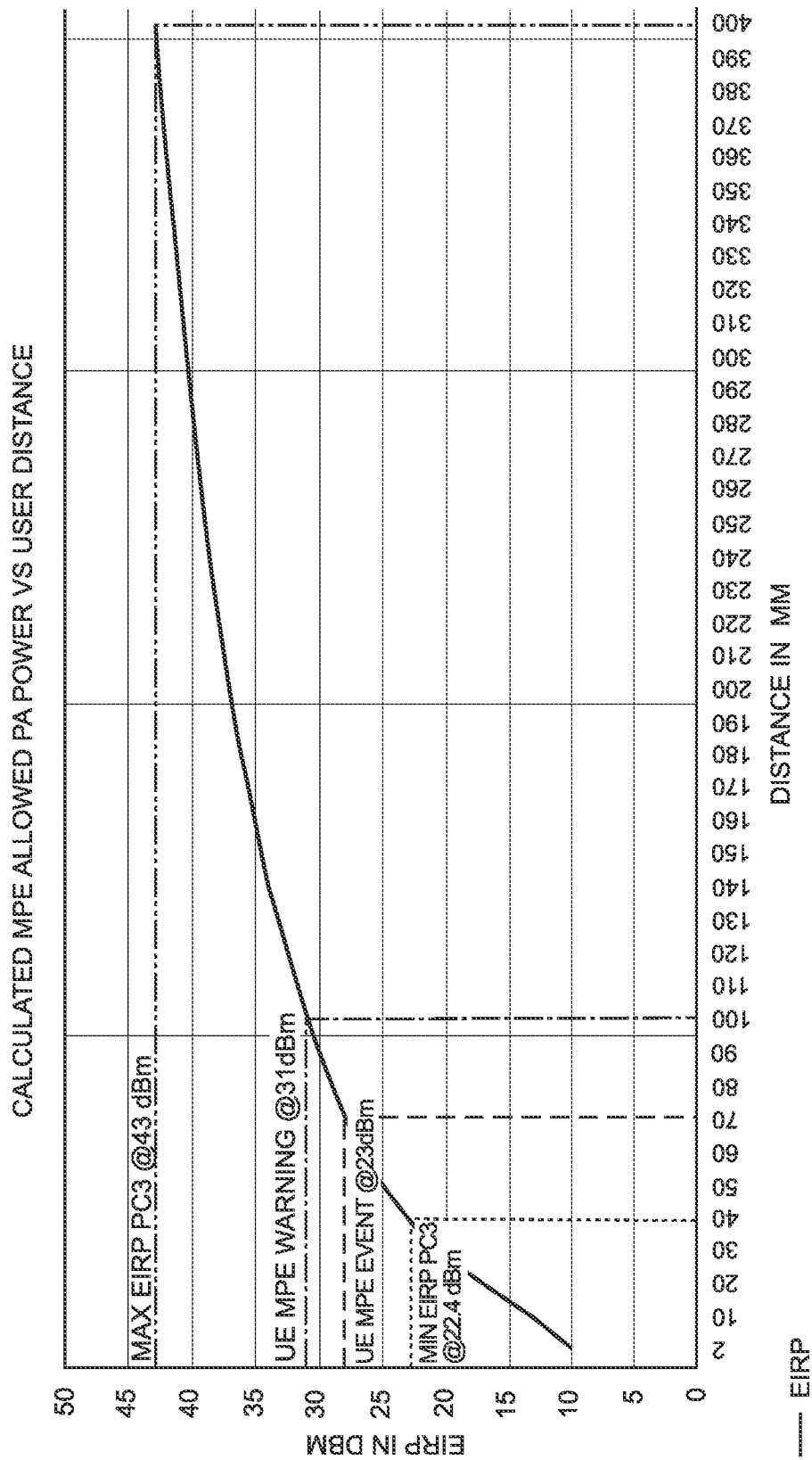
FIG. 7A is an example graph of maximum allowed EIRP values for MPE compliance according to at least one example embodiment.

FIGS. 4 to 6 illustrate examples transmission flow diagrams according to some example embodiments. FIG. 7A is an example graph of maximum allowed EIRP values for MPE compliance according to at least one example embodiment. FIG. 7B is a table illustrating example UL gap periodicity values according to at least one example embodiment. FIG. 7C is an example of UL/DL scheduling according to some example embodiments.

Referring now to FIG. 4, FIG. 4 is a first example transmission flow diagram between at least one UE device and a RAN node illustrating an example rules-based UL gap configuration according to at least one example embodiment. According to at least one example embodiment, in operations S4010 and S4020, a UE device, such as UE device 120, etc., of FIG. 1, and a RAN node, such as the RAN node 110 of FIG. 1, may both be configured with, pre-configured with, and/or have stored in their respective memories, a default UL gap configuration (and/or a common rule-based UL gap configuration, cell-wide UL gap configuration, network-wide UL gap configuration, etc.), but the example embodiments are not limited thereto. The default UL gap configuration may provide configurations and/or common rules associated with UL gap scheduling for UE devices located within the cell coverage area (e.g., cell coverage area 110A) of the RAN node 110, but the example embodiments are not limited thereto. For example, the default UL gap configuration may be defined in a wireless protocol (e.g., RAT, etc.) employed by the RAN node 110 and/or the UE device 120, such as the 5G NR protocol, a future 6G protocol, etc., a network operator (e.g., a wireless network service provider, etc.), etc., but the example embodiments are not limited thereto.

According to some example embodiments, the default UL gap configuration may include a default UE maximum transmission (TX) power limit value (e.g., a power back-off value, a EIRP value, etc.) which defines a maximum power level which the UE device 120 may use during each of the UL gaps, but the example embodiments are not limited thereto. The UE maximum TX power limit may be set by the RAT standard, e.g., the 5G NR protocol, etc., and/or may be set by a network operator, the RAN node 110, etc., but the example embodiments are not limited thereto. Additionally, the default UL gap configuration may also include a maximum allowed power when a user is present limit which may be set in accordance with relevant regulations, such as FCC EIRP regulations, etc., recommendations from scientific organizations, such as International Commission on Non-Ionizing Radiation Protection (ICNIRP) recommendations, etc., a network operator, the RAN node 110, etc., but the example embodiments are not limited thereto.

For example, according to at least one example embodiment, the UE maximum TX power limits may be dynamically set based on the maximum allowed EIRP regulations as shown in FIG. 7A and a determined (and/or estimated) distance between the UE device 120 and the user (or any other person), but the example embodiments are not limited thereto. The EIRP refers to the UE device 120's wireless antenna panel's PA power plus the wireless antenna panel's array gain, and the maximum EIRP is dependent on the distance between the wireless antenna panel from the user and/or other person. As shown in FIG. 7A, assuming that the UE 120 includes a 1×4 antenna array with a 12 dB antenna gain, a UE may operate at a maximum EIRP of 43 dBm (decibel-milliwatts) at a distance of 400 mm from the user but only with an EIRP of 10 dBm when the user is at a distance of 2 mm, according to current regulations specified by the FCC.

Moreover, according to some example embodiments, the default UL gap configuration may set at least one of a MPE warning distance threshold value and/or a MPE event distance threshold value, etc., but is not limited thereto. For example, as shown in FIG. 7A, the MPE warning distance threshold may be set at 100 mm, and the MPE event distance threshold value may be set at 70 mm, but the example embodiments are not limited thereto. According to at least one example embodiment, if the UE device 120 determines and/or estimates that a person is within the MPE warning distance threshold (e.g., the user is between 71 mm to 100 mm of the UE device, etc.), the UE device 120 may transmit an MPE warning message to the RAN node 110 requesting the RAN node 110 to increase the UL gap periodicity, etc., but the example embodiments are not limited thereto. Additionally, if the UE device 120 determines and/or estimates that a person is within the MPE event distance threshold (e.g., the user is between 2 mm to 70 mm of the UE device, etc.), the UE device 120 may transmit an MPE event message to the RAN node 110 requesting the RAN node 110 to further increase the UL gap periodicity, etc., but the example embodiments are not limited thereto, and for example, other distances may be used for the MPE warning distance threshold and/or the MPE event distance threshold, and/or additional distance thresholds may be set, etc. The MPE warning message and the MPE event message will be discussed in greater detail below.

Additionally, according to at least one example embodiment, the default UL gap configuration may also include one or more settings related to a default UL gap scheduling (e.g., UL gap scheduling information, etc.) set by the RAN node 110 and/or the core network 100, etc., such as a UL gap periodicity value (e.g., the frequency and/or periodicity of UL gaps, etc.), and/or a UL gap duration value (e.g., the number of OFDM symbols and/or the number of slots that one UL gap covers, etc.), but the example embodiments are not limited thereto. According to some example embodiments, the default UL gap duration value may be defined by the relevant RAT protocol, but is not limited thereto. For example, for the 5G NR protocol, the default UL gap duration is 1 slot (e.g., 14 OFDM symbols using normal cyclic-prefix (CP), etc.), but the example embodiments are not limited thereto and the UL gap duration may be configurable.

As shown in FIG. 7B, according to some example embodiments, the default UL gap configuration may set a plurality of UL gap periodicity values based on different distances between the user and the UE device 120. For example, as shown in FIG. 7A, the default UL configuration may set a MPE event distance range as being between 2 mm to 70 mm, a MPE warning distance range as being between 71 mm to 100 mm, and a long (and/or non-MPE, normal, default, etc.) distance range as being any distance greater than 100 mm, but the example embodiments are not limited thereto, and other distance range values may be used. If the UE device 120 determines and/or estimates that a user is in the long, default, and/or normal distance range, assuming that the wireless system is using FR 2 in numerology 3, SCS=120 kHz and 1 subframe includes 8 slots in 1 ms, the applicable UL gap periodicity value may be 0.0625%, which is the equivalent of having 1 UL gap for every 1600 slots, or having 1 UL gap every 200 ms, but the example embodiments are not limited thereto. If the UE device 120 determines and/or estimates that the user is within the MPE warning distance range, the UE device 120 may transmit an MPE warning message to the RAN node 110 requesting that the RAN node 110 change the UL gap periodicity to the MPE warning periodicity of 0.125%, etc. If the UE device 120 determines and/or estimates that the user is within the MPE event distance range, the UE device 120 may transmit an MPE event message to the RAN node 110 requesting that the RAN node 110 change the UL gap periodicity to the MPE event UL gap periodicity of 0.25%, but the example embodiments are not limited thereto.

While FIGS. 7A and 7B depict some example UL gap configuration values, the example embodiments are not limited thereto, and one or more of the UL gap configuration values may be added, removed, and/or modified, etc., from the settings and/or values shown in these figures.

Returning to FIG. 4, in operation S4030, the UE device 120 may transmit a message (e.g., a UE capabilities message) to the RAN node 110 indicating that the UE device 120 supports MPE UL gaps, etc. In other words, the UE device 120 may inform the RAN node 110 that the UE device 120 is capable of estimating and/or determining the distance between the UE device 120 and a user using at least one proximity sensor (e.g., the wireless antenna panel 3400 configured as a radar proximity sensor, etc.), but the example embodiments are not limited thereto. Additionally, the UE capabilities message may include additional information, such as the UE device 120's power headroom (PH) settings for triggering MPE UL gaps, etc., but the example embodiments are not limited thereto.

In operation S4040, the RAN node 110 may transmit a RRC configuration to the UE device 120 and thereby establish a network connection with the UE device 120 and the RAN node 110, and the UE device 120 may begin transmitting and/or receiving data in accordance with UL and/or DL scheduling set by the RAN node 110, including the default UL gap scheduling, etc., but the example embodiments are not limited thereto. For example, as shown in the top row (e.g., the long UL gap setting and/or the normal UL gap setting, etc.) of FIG. 7C, the communication scheduling may include DL, UL, S, and/or UL gap slots, etc. Moreover, the example embodiments are not limited to the example shown in FIG. 7C, and FIG. 7C is provided for illustrative purposes only and for the sake of clarity and lack of space, do not correspond to the example embodiments discussed above, such as the example UL gap periodicity values of FIG. 7B.

In operation S4050, the RAN node 110 may determine whether an MPE-related message has been received from the UE device 120. The MPE-related message may refer to at least one of a MPE warning message, a MPE event message, etc., but is not limited thereto. In response to the RAN node 110 determining that no MPE-related message has been received from the UE device 120, the RAN node 110 may use the long UL gap configuration settings and/or values, such as the long and/or default UL gap scheduling information (e.g., default UL gap periodicity and/or default UL gap duration values, etc.), but the example embodiments are not limited thereto.

Further, in operation S4060, the UE device 120 may perform user detection (e.g., radar-based user detection using the wireless antenna panel 3400 and/or the additional proximity sensors 3500, etc.) during at least one scheduled UL gap in accordance with the long and/or default UL gap scheduling information using the long, default, and/or maximum UL gap power level setting. If the UE device 120 does not detect a user, or detects a user within the UL gap, then the UE device 120 will continue to use the long and/or default UL gap configuration, etc., but is not limited thereto.

In operation S4070, during a second (and/or subsequent, following, next, future, etc.) UL gap, the UE device 120 may perform the user detection operation again and may detect that a person and/or user has been detected within the MPE warning distance range set in the default UL gap configuration using the wireless antenna panel 3400 and/or the additional proximity sensors 3500, etc. In operation S4080, based on the determined and/or estimated distance between the user and the UE device 120, the UE device 120 may transmit an MPE-related message, e.g., the MPE warning message, to the RAN node 110. As discussed earlier, the MPE-related message may be a MPE warning message or a MPE event message, but is not limited thereto, and according to some example embodiments, the MPE-related message may indicate the estimated power back-off, may be a request from the UE device 120 for new UL gap configuration settings, etc.

In operation S4090, the RAN node 110 may receive the MPE warning message from the UE device 120, and may adopt a UL gap periodicity corresponding to the MPE warning based on the default UL gap configuration. For example, as shown in FIG. 7B, the RAN node 110 may adopt a default MPE warning (e.g., medium) UL gap periodicity setting of 0.125%, etc., but the example embodiments are not limited thereto. Additionally, the RAN node 110 may adopt a default (e.g., medium) UL gap duration setting corresponding to the MPE warning, etc., but is not limited thereto.

In operation S4100, the UE 120 also adopts UL gap configuration settings corresponding to the MPE warning, such as MPE warning (e.g., medium) UL gap periodicity settings, MPE warning UL gap duration settings, and/or MPE warning UL gap power levels, etc., but the example embodiments are not limited thereto. For example, as shown in the second row of FIG. 7C, after the RAN node 110 and the UE device 120 adopt the UL gap configuration corresponding to the MPE warning level and/or the medium level, the periodicity of the UL gaps in the UL/DL scheduling for the UE device 120 may be increased in comparison to the periodicity of the UL gaps when the UE device 120 is in a long, default, and/or normal state. Moreover, as shown in the third row of FIG. 7C, after the RAN node 110 and the UE device 120 adopt the UL gap configuration corresponding to the MPE event level (e.g., the short level, the minimum level, etc.), the periodicity of the UL gaps for the UE device 120 may be further increased in comparison to the periodicity of the UL gaps when the UE device 120 is in a long, default, and/or normal state, and the periodicity when the UE device 120 is in the MPE warning state, etc., but the example embodiments are not limited thereto. Additionally, the UE device 120 may dynamically change the maximum UL gap transmission power level based on the detected and/or estimated distance between the UL device 120 and the person and the EIRP power corresponding to the chart of FIG. 7A, but the example embodiments are not limited thereto.

Further, in operation S4110, the UE device 120 may perform another user detection during the next scheduled UL gap based on the MPE warning UL gap configuration settings. In the event that the UE device 120 detects a person within the MPE event distance range, the UE device 130 may transmit a second MPE-related message to the RAN node 110. For example, the second MPE-related message may be a MPE event message, but the example embodiment is not limited thereto. According to some example embodiments, the MPE event message may include the actual power back-off, may be a request from the UE device 120 for new UL gap configuration settings corresponding to the MPE event, etc., but the example embodiments are not limited thereto.

In operation S4130, the RAN node 110 may adopt the default UL gap configuration settings corresponding to the MPE event. For example, as shown in FIG. 7B, the RAN node 110 may adopt the MPE event (e.g., minimum) default UL gap periodicity of 0.25%, but the example embodiments are not limited thereto. Additionally, the RAN node 110 may adopt a default (e.g., minimum) UL gap duration setting corresponding to the MPE event, etc., but is not limited thereto.

In operation S4140, the UE 120 also adopts UL gap configuration settings corresponding to the MPE event, such as MPE event (e.g., minimum) UL gap periodicity settings, MPE event UL gap duration settings, and/or MPE event UL gap power levels, etc., but the example embodiments are not limited thereto. For example, the UE device 120 may dynamically change the maximum UL gap transmission power level based on the detected and/or estimated distance between the UL device 120 and the person and the EIRP power corresponding to the chart of FIG. 7A, but the example embodiments are not limited thereto.

Further, in operation S4150, the UE device 120 may perform another user detection during the next scheduled UL gap based on the MPE event UL gap configuration settings. In response to the UE device 120 detecting a person leaving the MPE event distance range and going into the MPE warning distance range, in operation S4160, the UE device 130 may transmit a third MPE-related message to the RAN node 110. For example, the third MPE-related message may be a message indicating the MPE event has ended, and/or may be another MPE warning message, but the example embodiments are not limited thereto.

According to at least one example embodiment, in operation S4170, the RAN node 110 returns to the MPE warning (e.g., medium) UL gap configurations, such as the medium UL gap periodicity settings and/or the medium UL gap duration settings, etc., in response to the third MPE-related message, but the example embodiments are not limited thereto.

In operation S4180, the UE device 120 also returns to the MPE warning UL gap configurations, such as the MPE warning UL gap scheduling settings and/or the MPE warning UL gap power level settings, etc., but the example embodiments are not limited thereto.

In operation S4190, the UE device 120 performs another user detection operation during the next schedule UL gap based on the MPE warning UL gap configuration settings. If the UE device 120 determines that the user is now in the long and/or normal distance range, in operation S4200, the UE device 120 transmits a fourth MPE-related message to the RAN node 110 indicating that the MPE warning has ended.

In operations S4210 and S4220, the RAN node 110 and the UE device 120 both adopt the maximum (e.g., long, default, etc.) UL gap configuration settings, etc.

Referring now to FIG. 5, FIG. 5 is a second example transmission flow diagram between at least one UE device and a RAN node illustrating an example dynamic-based UL gap configuration according to at least one example embodiment.

According to at least one example embodiment, the RAN node 110 and/or the UE device 120 may or may not be configured with, pre-configured with, and/or store default UL gap configuration settings. Instead, in contrast to the at least one example embodiment illustrated in FIG. 4, the RAN node 110 may dynamically configure the UL gap configuration settings of the UE device 120 based on the MPE-related messages transmitted by the UE device 120 to the RAN node 110. Additionally, according to some example embodiments, the dynamic UL gap configurations may be UE-specific UL gap configurations, e.g., for a subset of the UE devices connected to the RAN node 110, thereby allowing the RAN node 110 to provide separate UL gap configurations to a second subset of UE devices, and/or schedule UL and/or DL slots in place of the scheduled UL gap slots for the UE devices that do not require UL gaps, etc., thereby increasing the total throughput of the cell service area of the RAN node 110, improving and/or optimizing the UL gap scheduling and performance of individual UE devices, etc.

In operation S5010, similar to operation S4030, the UE device 120 may transmit a UE capabilities message to the RAN node 110 indicating that the UE device 120 supports MPE UL gaps, etc., but is not limited thereto. In operation S5020, similar to operation S4040, the RAN node 110 and the UE 120 may establish an RRC connection, etc.

In operation S5030, the RAN node 110 may transmit a dynamic MPE UL gap configuration to the UE device 120. The dynamic UL gap configuration settings via RRC signaling, but the example embodiments are not limited thereto. For example, according to some example embodiments, the dynamic UL gap configuration settings may be transmitted using MAC-CE signaling, DCI signaling, etc., but the example embodiments are not limited thereto. According to at least one example embodiment, the dynamic UL gap configuration settings may be specific to the UE device 120 and/or may be applicable to a subset of the total set of UE devices connected to the RAN node 110, and for example, may be only transmitted to and/or restricted to UE devices using a desired CSI beam, etc., instead of every UE device in the cell, but the example embodiments are not limited thereto. This may reduce the amount of signaling overhead experienced in the cell corresponding to the RAN node 110 by increasing the periodicity UL gap signaling for UEs experiencing a MPE event, and/or may increase the total throughput of the cell by allowing the RAN node 110 to schedule regular UL and/or DL slots for the UEs that are not experiencing a MPE event during the time periods corresponding to scheduled UL gaps for the UEs experiencing MPE events, etc. Additionally, according to some example embodiments, the updated UL gap configuration settings may be broadcast by the RAN node 110 to every UE device within the cell coverage area of the RAN node 110, etc., but the example embodiments are not limited thereto.

Further, according to some example embodiments, the dynamic UL gap configuration setting may include a new UL gap periodicity setting and/or value which may be used by the UE device 120 instead of and/or may replace the stored default UL gap periodicity setting, etc. The dynamic UL gap configuration setting may also include a new UE maximum transmission power limit and/or a new UE maximum transmission power range set by the RAN node 110 and/or the core network 100 for each scheduled UL gap, etc. Additionally, the dynamic UL gap configuration setting may further include a new UL gap duration setting and/or value, which may be used by the UE device 120 instead of and/or may replace the stored default UL gap duration setting, etc., but the example embodiments are not limited thereto. The RAN node 110 may determine the dynamic UL gap configuration settings based on network conditions, UE signal quality and/or performance indicators, etc., but the example embodiments are not limited thereto.

In operation S5040, the UE device 120 may perform a user detection operation using the wireless antenna panel and/or additional proximity sensors during a scheduled UL gap in accordance with the dynamic UL gap configuration settings to determine and/or estimate the presence of a person within the proximity of the UE device 120, and/or determine and/or estimate the distance between the person the UE device 120, but the example embodiments are not limited thereto. In operation S5050, in response to the UE device detecting a person within the MPE warning distance range, the UE device 120 may transmit a MPE-related message, e.g., a MPE warning message, to the RAN node 110.

In operation S5060, in response to the MPE warning message, the RAN node 110 may determine new, updated, and/or modified dynamic UL gap configuration settings for the UE device 120 and may transmit the new dynamic UL gap configuration settings to the UE device 120. According to some example embodiments, the dynamic UL gap configuration settings may include only the UL gap configuration settings corresponding to the MPE warning in order to reduce the amount of data transmitted, but the example embodiments are not limited thereto.

In operation S5070, the UE device 120 (and the RAN node 110) may adopt the new dynamic UL gap configuration settings corresponding to the MPE warning (e.g., medium UL gap configuration settings, etc.), and may perform another user detection operation during the next scheduled UL gap, etc. In response to the UE device 120 detecting and/or determining that a person is within the MPE event distance range, in operation S5080, the UE device 120 transmits a second MPE-related message, e.g., a MPE event message, to the RAN node 110, etc., but is not limited thereto.

In operation S5090, the RAN node 110 may determine new, updated, and/or modified dynamic UL gap configuration settings corresponding to the MPE event, etc., and may transmit the new dynamic UL gap configuration settings to the UE device 120, but is not limited thereto. In operation S5100, the UE device 120 (and the RAN node 110) may adopt the new dynamic UL gap configuration settings corresponding to the MPE event, e.g., minimum UL gap configuration settings, etc., and the UE device 120 may perform another user detection operation during the next scheduled UL gap slot.

In operation S5110, the UE device 120 may determine that the person is no longer within the MPE event distance range and/or the person is now in the MPE warning distance range, etc., and in operation S5110, the UE device 120 may transmit a third MPE-related message indicating that the MPE event has ended, etc. In operation S5120, in response to the MPE event end message, the RAN node 110 may determine new, updated, and/or modified dynamic UL gap configuration settings corresponding to the MPE warning level (e.g., medium level, etc.), and may transmit the new dynamic UL gap configuration settings to the UE device 120. However, the example embodiments are not limited thereto, and for example, the RAN node 110 may simply transmit a message to the UE device 120 to revert to the previously transmitted dynamic UL gap configuration settings corresponding to the MPE warning level transmitted in operation S5060, etc. but the example embodiments are not limited thereto.

In operation S5130, the UE device 120 (and the RAN node 110) may adopt the dynamic UL gap configuration settings corresponding to the MPE warning level, and the UE device 120 may perform the user detection operation during the next scheduled UL gap slot. In response to the UE device 120 determining that the person is now in the maximum and/or normal distance range, in operation S51040, the UE device 120 may transmit a fourth MPE-related message to the RAN node 110 indicating that the MPE warning has ended. In operation S51050, the RAN node 110 may determine new, updated, and/or modified dynamic UL gap configuration settings corresponding to the default, maximum, and/or normal level, and may transmit the dynamic UL gap configuration to the UE device 120, etc.

Referring now to FIG. 6, FIG. 6 is a third example transmission flow diagram between at least one UE device and a RAN node illustrating an example combination of the rules-based and dynamic-based UL gap configuration according to at least one example embodiment.

In operation S6010, the UE device 120 may transmit a physical random access channel (PRACH) procedure (e.g., a PRACH preamble) to the RAN node 110 to establish downlink (DL) and uplink (UL) synchronization with the RAN node, but the example embodiments are not limited thereto. According to some example embodiments, both the UE device 120 and the RAN node 110 may be configured with, pre-configured with, and/or have stored in their respective memories, a default UL gap configuration (e.g., a rules-based UL gap configuration, a common UL gap configuration, a cell-wide UL gap configuration, etc.).

In operation S6020, the UE device 120 may transmit a UE capabilities message to the RAN node 110 indicating that the UE device 120 supports MPE UL gaps, etc. In operation S6030, the RAN node 110 may transmit a RRC configuration to the UE device 120 and thereby establish a connection with the UE device 120 as well as scheduling the UE device 120 for UL/DL scheduling. According to at least one example embodiments, the RAN node 110 also schedules the UE device 120 for UL gap based on the default UL gap configuration, etc.

In operation S6040, the UE device 120 may perform a user detection operation using the wireless antenna panel 3400 and/or the additional proximity sensors 3500 in accordance with the default UL gap configuration settings (e.g., using the default UL gap power settings, default UL gap periodicity settings, and/or default UL gap duration settings, etc.) corresponding to the long and/or normal level.

In optional operation S6050, similar to operation S5060, the RAN node 110 may transmit updated, modified, new, and/or dynamic UL gap configuration settings via RRC signaling, MAC-CE signaling, DCI signaling, etc., but the example embodiments are not limited thereto.

Further, according to some example embodiments, the dynamic UL gap configuration setting may include a new UL gap periodicity setting and/or value which may be used by the UE device 120 instead of and/or may replace the stored default UL gap periodicity setting, etc. The dynamic UL gap configuration setting may also include a new UE maximum transmission power limit and/or a new UE maximum transmission power range set by the RAN node 110 and/or the core network 100 for each scheduled UL gap, etc. Additionally, the dynamic UL gap configuration setting may further include a new UL gap duration setting and/or value, which may be used by the UE device 120 instead of and/or may replace the stored default UL gap duration setting, etc., but the example embodiments are not limited thereto.

For example, according to some example embodiments, the RAN node 110 may determine a new UL gap duration value based on the information provided in the UE capabilities message, e.g., determine the amount of time the UE device 120 needs to calculate the distance between the user and the UE device, and may then decrease the number of OFDM symbols allocated for each individual UL gap based on the determined amount of time. Using the assumptions discussed in connection with FIG. 3, the UE device 120 may only require 7 pulses (symbols) to determine the estimated distance between the UE device and the user. Consequently, the RAN node 110 may decrease the duration of the UL gap from 1 slot (e.g., 14 symbols) to, for example, half a slot, since that is sufficient for the UE to perform a valid radar scan, but the example embodiments are not limited thereto. Further, according to some example embodiments, by dynamically decreasing the UL gap duration the UE device 120 may use the remaining symbols of the scheduled UE gap to perform UL and/or DL, etc., or may perform self-calibration (e.g., PA calibration, etc.) without the need for separate UL gaps dedicated to self-calibration operations, etc., but the example embodiments are not limited thereto.

Additionally, according to some example embodiments, updated UL gap configuration settings may be broadcast to every UE device within the cell coverage area of the RAN node 110, etc., but the example embodiments are not limited thereto. The broadcasted UL gap configuration settings may be a replacement for the default UL gap configuration settings stored in the memory of the UE devices, but the example embodiments are not limited thereto.

Further, according to some example embodiments, the dynamic UL gap configuration may include new UL gap configuration settings corresponding to the MPE warning (e.g., medium) level, and/or new UL gap configuration settings corresponding to the MPE event (e.g., minimum and/or short) level, but the example embodiments are not limited thereto.

After the transmission of the dynamic UL gap configuration to the UE device 120, the RAN node 110 and the UE device 120 may begin using the dynamic UL gap configuration, or in other words, the RAN node 110 may adjust the scheduling for the UE device 120 to incorporate the new UL gap periodicity, new UL gap duration, etc., but the example embodiments are not limited thereto.

However, according to some example embodiments, operation S6050 may be omitted.

Next, in operation S6060, the UE device 120 may perform user detection using at least one proximity sensor, e.g., using the wireless antenna panels as a radar sensor, etc., and may estimate and/or determine the distance between the user and the UE device 120 during a scheduled UL gap (e.g., scheduled UL gap slot, scheduled UL gap time period, etc.), but the example embodiments are not limited thereto. Further, based on the determined and/or estimated distance between the user and the UE device 120, the UE device 120 may transmit an MPE-related message to the RAN node 110. As discussed earlier, the MPE-related message may be a MPE warning message or a MPE event message, but is not limited thereto, and according to some example embodiments, the MPE-related message may indicate the estimated power back-off, may be a request from the UE device 120 for new UL gap configuration settings, etc. For example, if the UE device 120 determines that the estimated distance falls within the MPE warning distance range, the UE device 120 may be triggered and/or caused to transmit a MPE warning message, etc.

In operation S6070, the UE device 120 (and the RAN node 110) may adopt the dynamic UL gap configuration settings corresponding to the MPE warning level, and the UE device 120 may perform the user detection operation during the next scheduled UL gap slot.

In response to the received MPE-related message, in optional operation S6050A, similar to operation S6050, the RAN node 110 may transmit updated, modified, new, and/or dynamic UL gap configuration to the UE device 120. The dynamic UL gap configuration of operation S6050A may be similar to the dynamic UL gap configuration of operation S6050, but the example embodiments are not limited thereto. Moreover, the dynamic UL gap configuration of operation S6050A may be responsive to the type of MPE-related message received from the UE device 120. For example, if the MPE-related message is a request from the UE device 120 for more frequent UL gap periodicity and/or shorter UL gap durations, the RAN node 110 may configure suitable UL gap periodicity and/or UL gap duration, etc., and transmit the dynamic UL gap configuration to the UE device 120, etc., but the example embodiments are not limited thereto. As another example, if the MPE-related message is an MPE-warning message, the RAN node 110 may determine that a RLF may occur in the near future, and may begin preparing alternative connection settings for the UE device 120, such as preparing multi-TRP, performing a handover (e.g., a RF2 handover, etc.) to another RAN node, redirecting beams, switching antenna panels, falling-back to a 4G connection, etc., before the UE device 120 suffers the RLF. Additionally, when the UE device 120 transmits a subsequent MPE event message (e.g., MPE event message, etc.), the RAN node 110 may complete the alternative connection settings for the UE device 120, etc., so that the RLF event is avoided.

Further, in operation S6080, after the transmission of the dynamic UL gap configuration to the UE device 120, the RAN node 110 and the UE device 120 may begin using the dynamic and/or rule-based UL gap configuration corresponding to the MPE warning level. Additionally, the UE device 120 may perform the user detection operation during the next scheduled UL gap slot, and in response to detecting that the user is within the MPE event distance range, the UE device 120 may transmit a MPE event start message to the RAN node 110.

In operation S6090, the UE device 120 (and the RAN node 110) may adopt the dynamic and/or rule-based UL gap configuration settings corresponding to the MPE event level.

In response to the received MPE-related message, in optional operation S6050B, similar to operations S6050 and S6050A, the RAN node 110 may transmit updated, modified, new, and/or dynamic UL gap configuration to the UE device 120 corresponding to the MPE event level, but the example embodiments are not limited thereto.

In operation S6100, the UE device 120 (and the RAN node 110) may adopt the dynamic and/or the rule-based UL gap configuration settings corresponding to the MPE event level, and the UE device 120 may perform the user detection operation during the next scheduled UL gap slot.

In response to the UE device 120 determining that the user is no longer in the MPE event distance range and/or the MPE warning distance range, the UE device 120 may transmit a message to the RAN node 110 indicating that the MPE event and/or the MPE warning states have ended. For example, the MPE-related message of S6100 may indicate that a corresponding MPE-warning event has ended with the user being outside of the MPE warning distance range, and/or a corresponding MPE-event has ended with the user no longer being in the MPE-event distance range, etc., but the example embodiments are not limited thereto. Additionally, according to some example embodiments, the MPE-related message may include a newly determined estimated distance between the UE device 120 and the user, but is not limited thereto.

In operation S6110, the UE device 120 (and the RAN node 110) may adopt the dynamic and/or the rule-based UL gap configuration settings corresponding to the MPE warning level or the long, normal, and/or default level, as appropriate.

Various example embodiments are directed towards enhancements to UL gaps used by UE devices to detect the presence of a user nearby, and more specifically, enabling the implementation of dynamic UL gap scheduling by the network and/or dynamic maximum UL power back-off of a UE's transmission power based on the detected distance of a person to the UE device. Accordingly, one or more of the example embodiments provide improvements by allowing a UE and/or a RAN node to dynamically configure UL gaps so that the periodicity of the scheduled UL gaps is increased (e.g., become more frequent, etc.) if a person is detected within a desired warning range of the UE device, so that the UE device may more accurately and more frequently determine the person's distance away from the UE device and appropriately decrease the maximum transmission power limit of the UE device. Also, one or more of the example embodiments enable the modification of the scheduled duration of the UL gaps based on the distance of the UE device to the user to increase the throughput of the UE device. Further, one or more of the example embodiments provide UE specific UL gaps and/or UL gap configuration settings so that a RAN node may schedule UE devices which do not utilize MPE UL gaps and/or do not need to perform power back-off due to the presence of a person to perform UL and/or DL during a UL gap scheduled for other UE devices which have triggered a MPE event, etc.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A user equipment (UE) device comprising:
a wireless antenna array configured to communicate with a radio access network (RAN) node;
a memory storing computer readable instructions and an uplink (UL) gap configuration, the UL gap configuration including UL gap scheduling and a UE maximum transmission power limit for each UL gap, the UL gap scheduling including a UL gap periodicity value and a UL gap duration value; and
processing circuitry configured to execute the computer readable instructions to cause the device to,
determine estimated distance information between a user and the device using the wireless antenna array during at least one first scheduled UL gap of the UL gap scheduling in accordance with the UE maximum transmission power limit, the UL gap scheduling based on a default UL gap periodicity value and a default UL gap duration value,
transmit a maximum permissible exposure (MPE)-related message to the node based on the estimated distance information and a desired MPE threshold,
adjust the UL gap configuration based on the transmitted MPE-related message;
update the estimated distance information between the user and the device during at least one second scheduled UL gap.

2. The device of claim 1, wherein the device is further caused to:
receive a dynamic UL gap configuration from the node in response to the MPE-related message, the dynamic UL gap configuration including at least one of a new UE maximum transmission power limit, a new UL gap duration value, a new UL gap periodicity value, or any combinations thereof.

3. The device of claim 2, wherein
the received dynamic UL gap configuration includes the new UE maximum transmission power limit; and
in response to the received dynamic UL gap configuration including the new UE maximum transmission power limit, the device is further caused to adjust the UL maximum transmission power limit of the wireless antenna array for at least one second scheduled UL gap based on the estimated distance information and the new UE maximum transmission power limit.

4. The device of claim 2, wherein
the received dynamic UL gap configuration includes the new UL gap duration value, new UL gap periodicity, or both the new UL gap duration value and the new UL gap periodicity value; and
in response to the received dynamic UL gap configuration including the new UL gap duration value, new UL gap periodicity value, or both the new UL gap duration value and the new UL gap periodicity value, the device is further caused to adjust the UL gap scheduling based on the received dynamic UL gap configuration.

5. The device of claim 2, wherein the device is further caused to:
receive the dynamic UL gap configuration via RRC signaling, MAC signaling, DCI signaling, or any combinations thereof, the dynamic UL gap configuration being UE-specific.

6. The device of claim 1, wherein the desired MPE threshold is at least one of:
an MPE event report threshold, an MPE warning report threshold, an estimated power back-off report threshold, or any combinations thereof.

7. The device of claim 1, wherein the device is further caused to:
transmit a UE capabilities message to the node, the UE capabilities message indicating the device supports MPE UL gaps; and
receive a dynamic UL gap configuration or a common UL gap configuration from the node in response to the transmitted UE capabilities message.

8. The device of claim 1, wherein the device is further caused to:
receive a broadcast message from the node, the broadcast message including a new UL gap configuration; and
update the UL gap scheduling based on the received new UL gap configuration.

9. The device of claim 1, wherein the device is further caused to:
transmit a second MPE-related message to the node based on the updated estimated distance information and the desired MPE threshold; and
adjust the UL gap configuration based on the second transmitted MPE-related message.

10. A radio access network (RAN) node comprising:
a memory storing computer readable instructions; and
processing circuitry configured to execute the computer readable instructions to cause the node to,
receive a maximum permissible exposure (MPE)-related message from at least one first user equipment (UE) device,
adjust a UL gap configuration for the at least one first device based on the received MPE-related message, the adjusted UL gap configuration causing the at least one first device to determine an estimated distance information between a user of the at least one first device and the at least one first device during at least one scheduled UL gap.

11. The node of claim 10, wherein the received MPE-related message is at least one of an MPE event report, an MPE warning report, an estimated power back-off report, or any combinations thereof.

12. The node of claim 10, in response to the received MPE-related message, the node is further caused to:
determine at least one of a new UE maximum transmission power limit, a new UL gap duration value, a new UL gap periodicity value, or any combinations thereof, based on the received MPE-related message; and
transmit a dynamic UL gap configuration to the at least one first device, the dynamic UL gap configuration including at least one of the new UE maximum transmission power limit, the new UL gap duration value, the new UL gap periodicity value, or the combinations thereof.

13. The node of claim 12, wherein
the dynamic UL gap configuration is specific to the at least one first device; and
transmit the dynamic UL gap configuration via RRC signaling, MAC signaling, DCI signaling, or any combinations thereof.

14. The node of claim 12, wherein the node is further caused to:
perform a handover operation for the at least one first device based on the received MPE-related message.

15. The node of claim 10, wherein the node is further caused to:

receive a UE capabilities message from the at least one first device, the UE capabilities message indicating the UE supports MPE UL gaps;

determine a dynamic UL gap configuration for the at least one first device based on the UE capabilities message, the dynamic UL gap configuration including new UL gap scheduling based on a new UL gap duration value, a new UL gap periodicity value, or both the new UL gap duration value and the new UL gap periodicity value; and transmit the dynamic UL gap configuration to the at least one first device in response to the received UE capabilities message.

16. The node of claim 10, wherein the node is further caused to:

determine new UL gap configuration for all devices in a cell corresponding to the node; and broadcast the new UL gap configuration to the cell.

17. The node of claim 10, wherein the node is further caused to:

schedule at least one UL slot for at least one second device during the at least one scheduled UL gap for the at least one first device.

18. A method of operating a user equipment (UE) device, the method comprising:

determining estimated distance information between a user and the device using a wireless antenna array during at least one first scheduled UL gap of UL gap scheduling for the device associated with a UL gap configuration, the determining the estimated distance information performed in accordance with a UE maximum transmission power limit associated with the UL gap configuration, and the UL gap scheduling based on a default UL gap periodicity setting and a default UL gap duration;

transmitting a maximum permissible exposure (MPE)-related message to a radio access network (RAN) node based on the estimated distance information and a desired MPE threshold;

adjusting the UL gap configuration based on the transmitted MPE-related message; and updating the estimated distance information between the user and the device during at least one second scheduled UL gap.

19. The method of claim 18, further comprising:

receiving a dynamic UL gap configuration from the node in response to the MPE-related message, the dynamic UL gap configuration including at least one of a new UE maximum transmission power limit, a new UL gap duration setting, a new UL gap periodicity, or any combinations thereof.

20. The method of claim 18, further comprising:

transmitting a second MPE-related message to the node based on the updated estimated distance information and the desired MPE threshold; and adjusting the UL gap configuration based on the second transmitted MPE-related message.

* * * * *